Figure 7:
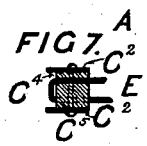
Figure 7:
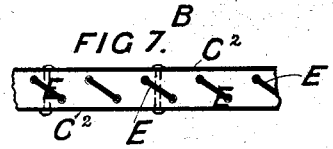
Figure 7:
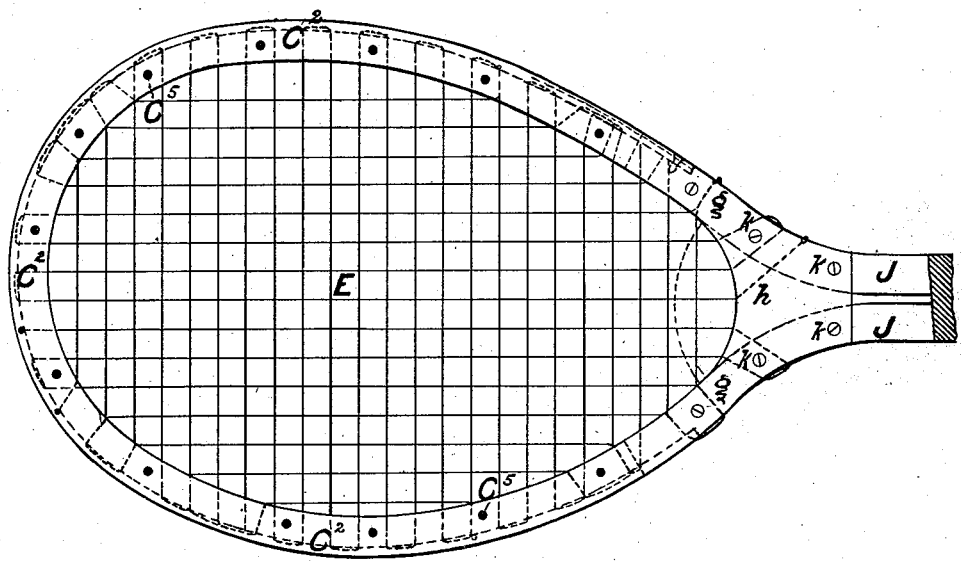

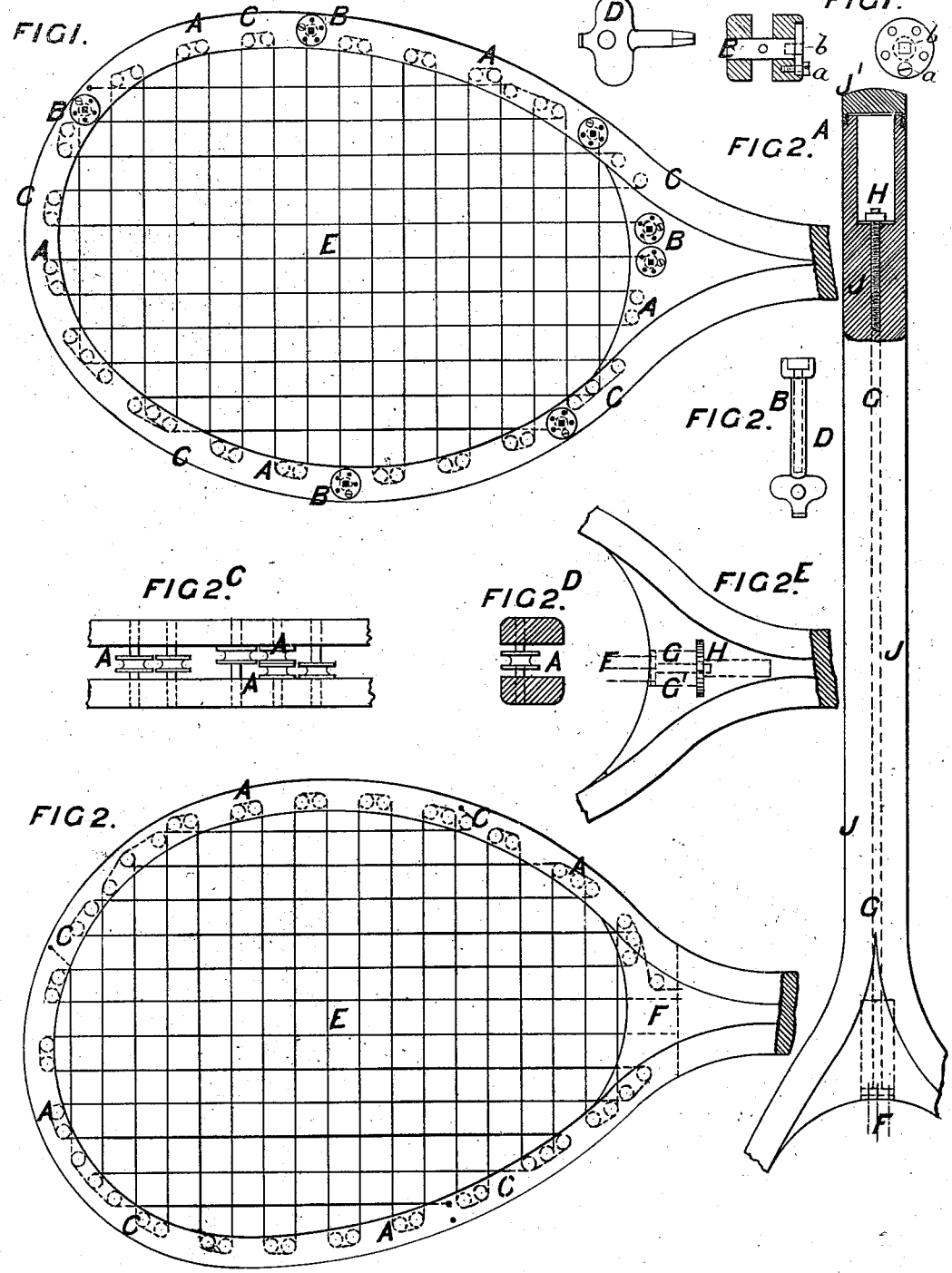

(No Model.) 4 Sheets—Sheet 2.
H. RICHARDSON.
Bat for Rackets, Lawn Tennis, &c.
No. 240,183. Patented April 12, 1881.
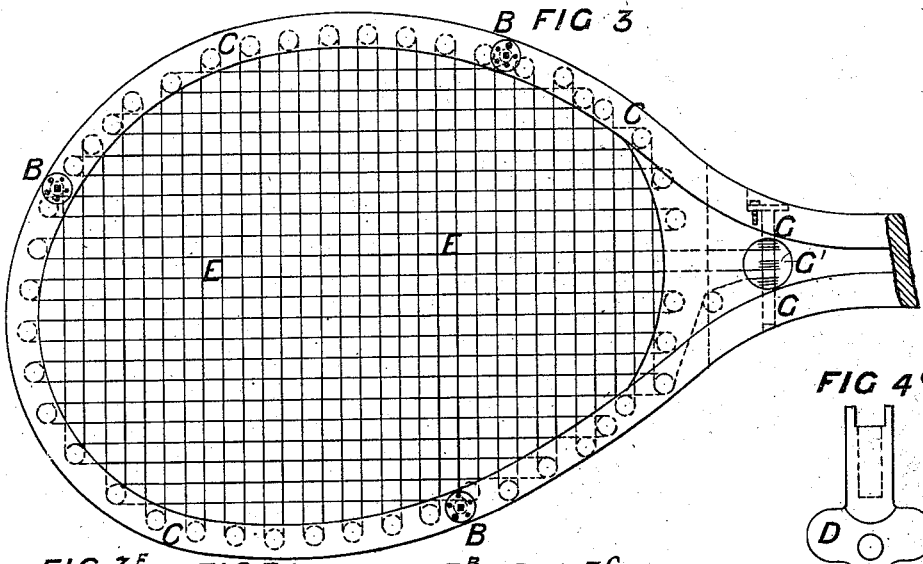
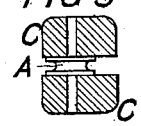
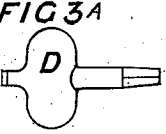
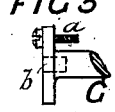
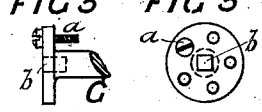
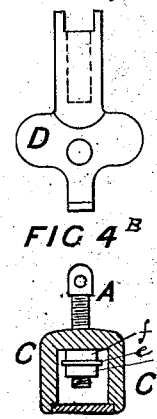
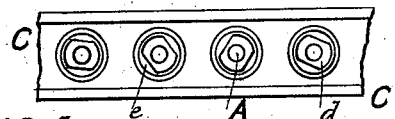
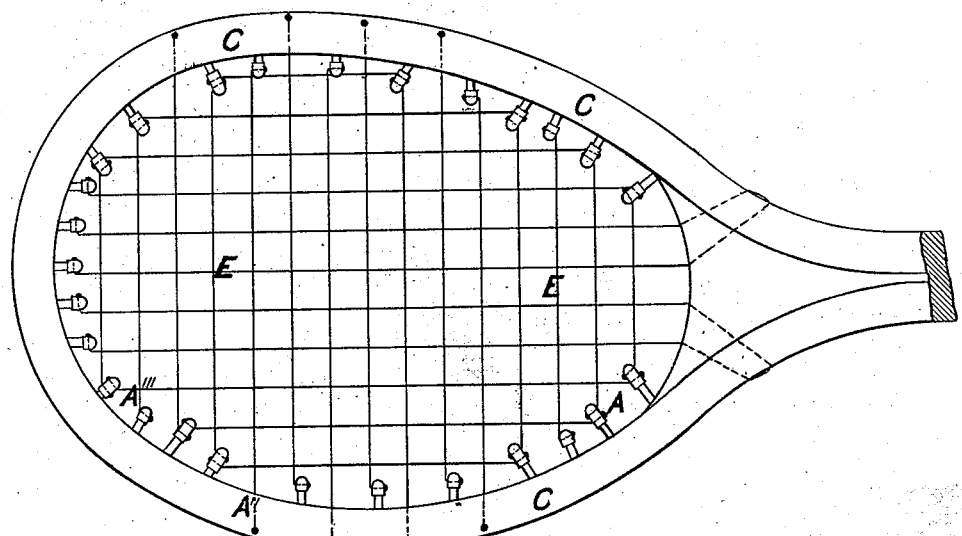
WITNESSES
INVENTOR
Henry Richardson

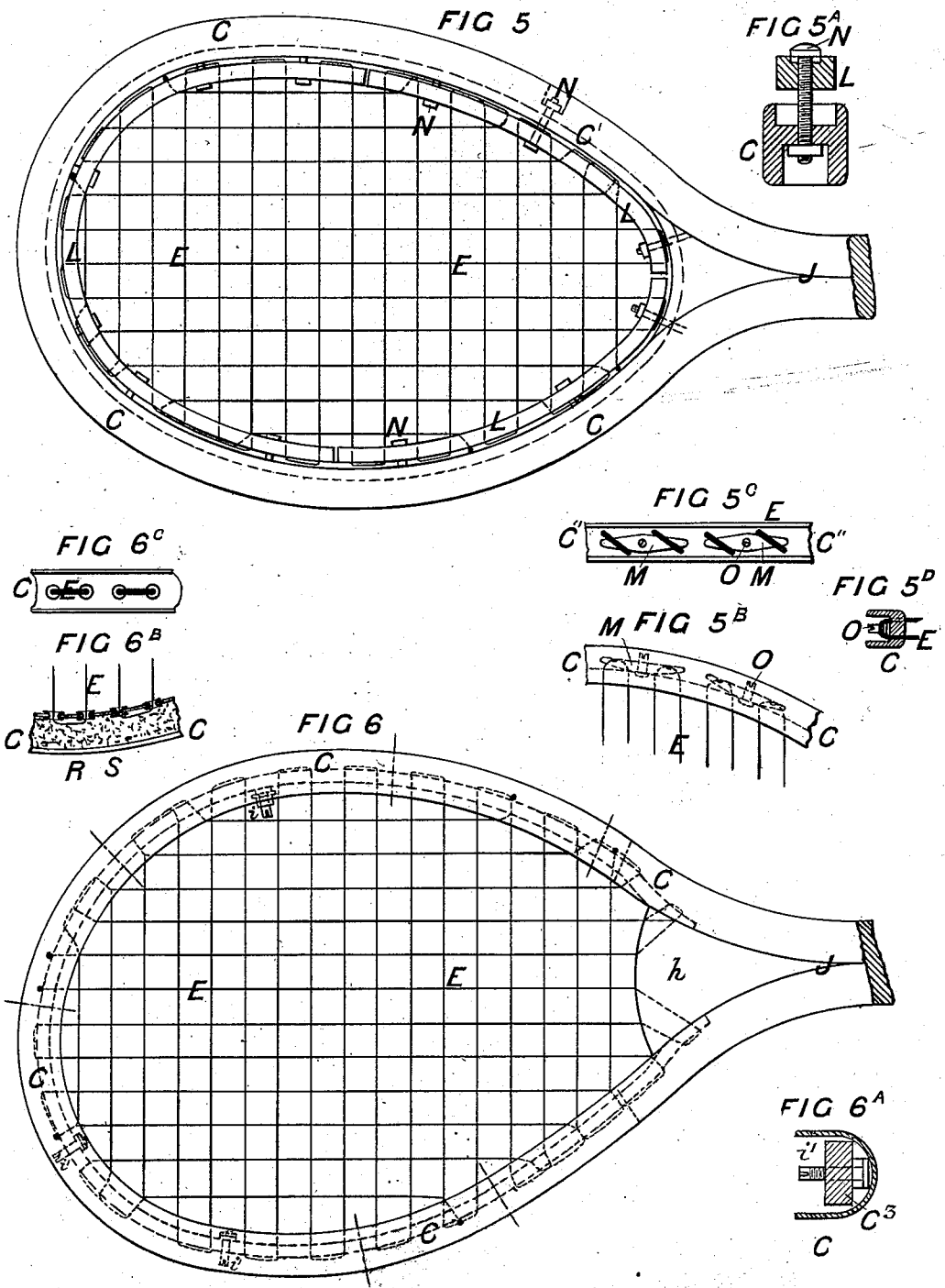

(No Model.) 4 Sheets—Sheet 4.

H. RICHARDSON.
Bat for Rackets, Lawn Tennis, &c.

No. 240,183. Patented April 12, 1881.

WITNESSES
Frederick John Cheesbrough
John Hamilton Redmond

INVENTOR
Henry Richardson

UNITED STATES PATENT OFFICE.

HENRY RICHARDSON, OF LIVERPOOL, COUNTY OF LANCASTER, ENGLAND.

BAT FOR RACKETS, LAWN-TENNIS, &c.

SPECIFICATION forming part of Letters Patent No. 240,183, dated April 12, 1881.

Application filed July 22, 1880. (No model.) Patented in England November 26, 1879.

*To all whom it may concern:*

Be it known that I, HENRY RICHARDSON, of the city of Liverpool, in the county of Lancaster, in that part of the United Kingdom of Great Britain and Ireland called England, a subject of the Queen of Great Britain, have invented new and useful Improvements in Bats for Rackets, Lawn-Tennis, Badminton, and like Games, (for which I have obtained a patent in Great Britain, No. 4,837, dated the 26th November, 1879;) and I do hereby declare that the following is a full, clear, and exact description of the construction and operation of my invention, reference being had to the sheets of drawings, making a part of this specification, in which—

Figures 1, 2, 3, 4, 5, 6, and 7 are general plans of different forms of my invention. The other figures of the drawings are details of the several forms of the invention, to be hereinafter again referred to and fully explained.

The essential features of my invention are that of mechanically tightening or straining the stringing of bats when such shall have become loose by change of temperature, or damp, or through usage, and constructing the frames of bats of steel or other suitable metal formed in a U or other suitable section.

Either of the following methods will accomplish the object of my invention.

Figures 1, 2, 3, $1^A$, $1^B$, $1^C$, $2^A$, $2^B$, $2^C$, $2^D$, $2^E$, $3^A$, $3^B$, $3^C$, $3^D$, $3^E$ are illustrative of my invention as coming under method A. According to this method I use a series of rollers, A, and starting or tightening pegs B. These rollers A are let into the frame C, and also into the upper portion of the handle of the tennis-bat, either by dividing the frame C by means of a saw-cut, or by forming the frame C of two vertical parallel pieces in manner such as shown at Figs. $2^C$ and $3^D$. The frame C is made of any suitable wood, or of ebonite, or of steel, or other suitable metal. The rollers A are placed in the saw-cut or between the two parallel pieces forming the frame C. The starting or tightening pegs B pass through the frames C in such manner that they can be wound up from the outside by a suitable key, (such as shown at Figs. $1^A$, $3^A$,) one end of which forms the key and the other end the screw-driver. The rollers A are free to revolve on their axes, and the tightening-pegs B are provided with stops or locking-screws $a$, and a provision, $b$, for inserting the key for winding, as illustrated in detail at Figs. $1^A$, $1^B$, $1^C$.

The stringing of the bat, which may be formed of catgut, or ordinary string, or other suitable known material, and which is hereinafter designated as the "stringing," and indicated by the letter E, commences from a tightening-peg, B, and is laced from roller to roller A horizontally, and from roller to roller A vertically, in lengths. The ends of the stringing E terminate at tightening-pegs, such as shown at Fig. $1^B$, provided with a stop-screw, such as $a$, and a provision, such as $b$, to receive the key D for tightening the stringing E by winding the same on the tightening-peg B, the stop-screw $a$, being removed before tightening and replaced after tightening. By winding the ends of the stringing E upon the pegs B any desired tension can be put upon the stringing E. The stringing E is, by preference, done in portions, as shown at Fig. 1, each portion commencing and terminating upon a tightening-peg B.

The drawing shown at Fig. 1 illustrates a bat with rollers A arranged to produce a nine-sixteenths of an inch mesh of the stringing E, as likewise the drawing Fig. 2. The drawing at Fig. 3 illustrates a bat with rollers A arranged to give a five-sixteenths of an inch mesh. In the bat shown at Fig. 2, the stringing E is brought to a point, as at F, to effect the simultaneous tightening by means of the screw-bolt G and nut H, which work in the recess K in the handle J of the bat, as shown at Fig. $2^A$. The end of the handle J is provided with a screwed metal cap, J', so that the player can tighten up the stringing E, when required, by screwing down the nut H by a suitable key, Fig. $2^B$. A modification of this simultaneous tightening is shown at Fig. $2^E$. The ends of the stringing E are attached to the head of the screw-bolt G, which works in the recess G', and which is actuated by the milled nut H, as illustrated. A further modification of the simultaneous tightening is shown at Fig. 3, in which, by winding the ends of the stringing E round the bolt G, which passes through the handle J and through the hole G', and which is provided with a stop-screw, $a$, and a provision, $b$, to receive the key for winding up the stringing, as shown in detail, Figs. $3^A$, $3^B$, and $3^C$. In stringing up the bats it is sometimes necessary to have a double roller. This is effected as shown at A′, Fig. 2$^C$ or 3$^D$. The handle J (shown at Fig. 2$^A$) may be used with any of the bats.

Fig. 4 is illustrative of my invention as coming under the method B. According to this method I use a series of small screw-eyebolts, A, positioned round the frame C and projecting through it on the inner side not less than one-quarter inch and countersunk on the outer side, and provided with an india-rubber washer or metal spring, $f$, a metal washer, $e$, and a nut, $d$. For details see Figs. 4$^A$ and 4$^B$. The stringing E is, by preference, cut in lengths corresponding with the widths and lengths required to string the bat. Each length is fastened by its ends to the respective eyebolts A, and may be fastened thus either at one end or both ends—that is, one end may be fastened to the frame of the bat and the other end to an eyebolt, as shown at A″, or both ends may be fastened to eyebolts, as shown at A‴. The fastening may be accomplished either by knotting, twisting, or, in the case of catgut, by swelling out the ends of the gut. By screwing down the nuts $d$ by means of a suitable key, such as shown at Fig. 4$^C$, or a pair of pliers, the screw-bolts A can be drawn within the frame C and tension thus put upon the stringing E, as will be understood. If desired, the stringing may be laced continously through the eyebolts A instead of being cut into lengths, as before mentioned.

Fig. 5 is illustrative of my invention as coming under the method C. According to this method I use an interior frame, band, or hoop, L, of cane, wood, metal, or other suitable material, bored with holes corresponding with the required stringing E of the bat. The frame L may be of one or more pieces, and is attached to the main frame C by a suitable number of screws or bolts and nuts, N, by the indrawing of which the two frames C and L are brought together, and the stringing E thereby tightened. The frame C is grooved at C′, as shown at Fig. 5$^A$, which is a section of the frame C, and as shown by the dotted lines C′, Fig. 5, to receive the frame L when the stringing is tightened up.

Fig. 5$^B$ is a side view, Fig. 5$^C$ is a front view, and Fig. 5$^D$ a section, of a method of tightening the stringing E by means of levers and screw-bolts M. The stringing E is passed over the ends of the levers M, as illustrated, the frame C being grooved at the outside, at C″, to receive the levers M. The stringing E is tightened by screwing down the bolts O, and thereby bringing the levers M up, as will be understood. These latter methods, Figs. 4, 5, 5$^B$, show my invention as it may be applied to bats strung with knots, or stringing such as is known as the "Gibrater stringing."

My invention further consists in substituting steel or other suitable metal for wood in the manufacture of frames of tennis or like bats. One method is illustrated at Fig. 6. This consists in forming the frame C of steel of U or other section. (See Fig. 6$^A$.) The stringing E is passed through holes in the frame of the bat, and also through the gusset-piece, which fits between the ends of the metal frame, and which is secured in position by screws, as shown; or the bat may be strung as per method A, B, or C, before described, or as shown at Fig. 5$^B$; or the bat may be strung, as shown at Fig. 6$^A$, round an inner band, C$^3$, formed of wood, cane, cork, gutta-perch, leather, or other suitable material.

If desired, the tightening of the stringing E may be effected by providing screw-bolts with nuts or sockets, as $i$ or $i'$, Fig. 6, by the action of which the frame C$^3$ is drawn out or expanded, and the stringing E thereby tightened.

In Fig. 6$^B$ R is a filling of paper, cork, or other suitable material, which is covered by the covering-band S.

Fig. 6$^C$ is a side view of Fig. 6$^B$.

In Fig. 7 the bat is shown with a metal frame, C, composed of two vertical parallel metal bands, C$^2$ C$^2$, embracing a band or hoop of wood, cane, cork, or other suitable material, C$^4$. (See Figs. 7$^B$ 7$^A$.) The bands C$^2$ are held and supported by the stays C$^5$, which also serve to secure the band C$^4$ in position. The stringing E is passed through the band C$^4$ and also through the handle, as shown in the drawings, and is covered over with a band of india-rubber, cloth, leather, gutta-percha, or other suitable material, which band I also employ in connection with the wooden or ebonite frame bats. This make of bats suits the tightening methods A, B, and C. I attach the handle to the metal frame by the method illustrated at Fig. 6—namely, by splitting the handle J and bending the split ends out, so as to form a gusset—the inside of the ends being of section to suit the metal frame, which fits in between the ends. The gusset or lower portion of the metal frame is fitted in before stringing with a gusset-piece, $h$, as before mentioned, and the handle and frame are secured and held together by bolts and nuts, as shown at Fig. 6.

In the arrangement shown at Fig. 7 the ends $g$ of the handle J and gusset-piece $h$ pass up between the vertical parallel metal bands C$^2$, and are secured thereto by the screws K. The gusset-piece $h$ may be as shown in full lines, or as shown in dotted lines.

Having now fully described and ascertained the nature, object, and purposes of this my invention, and shown how the same may be carried out into practical effect, I claim—

1. Constructing bats for rackets, lawn-tennis, badminton, and like games so that the stringing of such bats can be tightened, adjusted, and strained to any desired tension, when they have become slack, by means of rollers, screws, levers, or like mechanism, such as herein described and illustrated.

2. The method of tightening the stringing of the bat, consisting of a series of rollers and tightening-pegs set in the frame of the head and operated by means of a key, substantially as shown and described.

3. The method of tightening the whole stringing of the head from one point and at one operation, consisting of a rod or shaft set in the handle or frame of the bat and fitted with a nut or wrench, and connected to the system of strings drawn over a series of pulleys or loops, substantially as shown and described.

4. As a means for tightening the stringing of bats, the use and application of a series of adjustable levers, as shown at Figs. $5^B$, $5^C$, and $5^D$, operating substantially in the manner and for the purposes set forth.

5. A compound bat-frame composed of metal or metal and wood, or its described equivalent, joined together, substantially as shown and described.

6. The handle J of the bat, made detachable, and clamped between the metal pieces $C^2 C^2$ of the bat-frame, and secured by bolts or screws K, substantially as described.

In witness whereof I, the said HENRY RICHARDSON, have hereunto set my hand this 26th day of May, 1880.

HENRY RICHARDSON. [L. S.]

Witnesses:
FREDERICK JOHN CHEESBROUGH,
JOHN HAMILTON REDMOND,
*Both of 15 Water Street, Liverpool, England.*